J. B. ONAN.
Cotton-Planter.

No. 167,466. Patented Sept. 7, 1875.

WITNESSES:
E. Wolff
A. F. Terry

INVENTOR:
James B. Onan
BY
Munn
ATTORNEYS.

UNITED STATES PATENT OFFICE.

JAMES B. ONAN, OF PECAN POINT, ARKANSAS.

IMPROVEMENT IN COTTON-PLANTERS.

Specification forming part of Letters Patent No. 167,466, dated September 7, 1875; application filed June 26, 1875.

*To all whom it may concern:*

Figure 1:
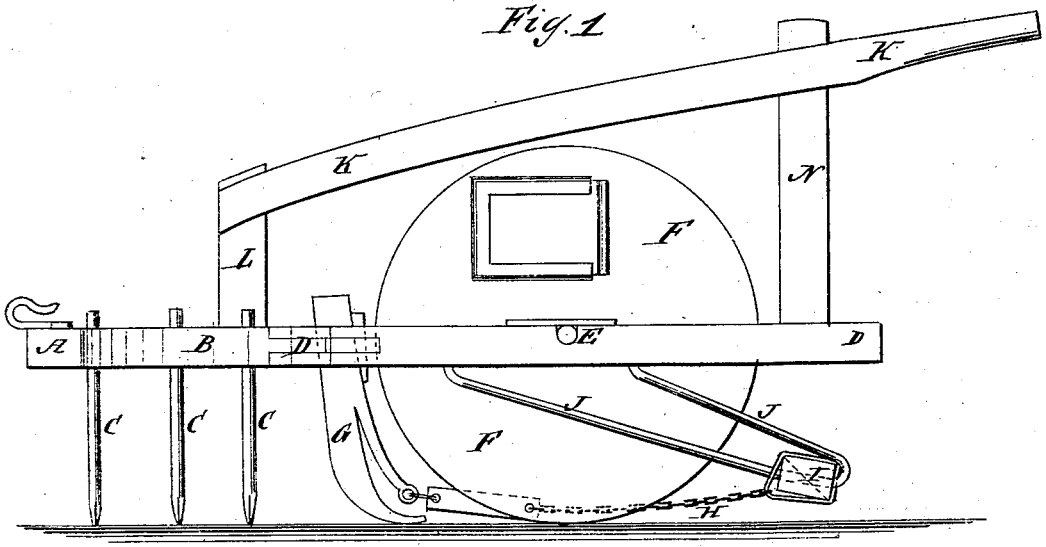
Figure 2:
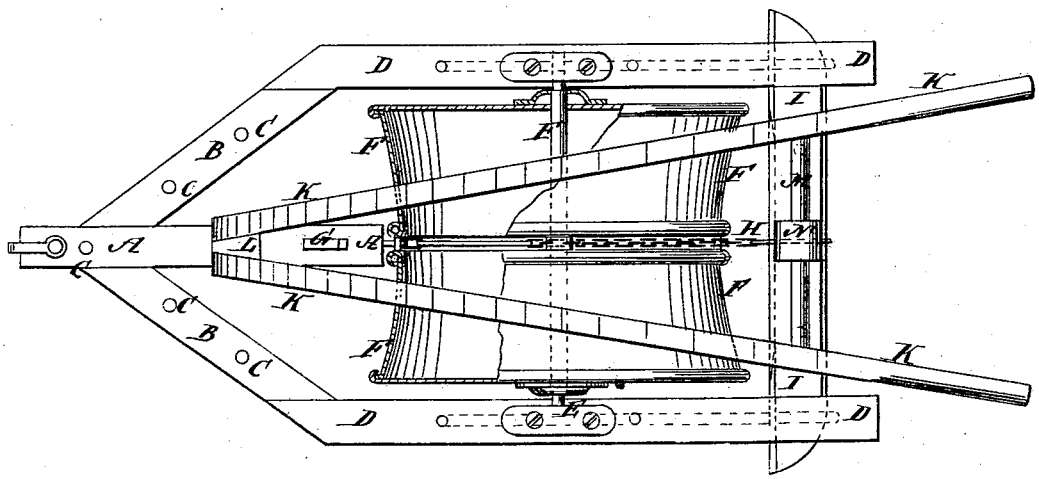

Be it known that I, JAMES B. ONAN, of Pecan Point, in the county of Mississippi and State of Arkansas, have invented a new and useful Improvement in Cotton-Planter, of which the following is a specification:

Figure 1 is a side view of my improved cotton-planter. Fig. 2 is a top view of the same, part being broken away to show the construction.

Similar letters of reference indicate corresponding parts.

The invention relates to the combination, with the revolving cylinder, of means for distributing the seed in the furrow, as hereinafter described.

A is the draw-bar, to the sides of the forward part of which are attached the forward ends of two inclined side bars, B, to which and to the bar A are attached teeth C, thus forming a small A-shaped harrow. To the rear ends of the bars B are attached the forward ends of two parallel bars, D, the rear ends of which are connected by a cross-bar. In bearings in the middle parts of the bars D revolve the journals of the shaft E, to which the dropping-cylinder F is attached. The cylinder F is formed of two short cylindrical vessels, made open at one end and closed at the other, and which are placed upon the shaft with their open ends toward each other, and are connected together by bolts or other couplings, so as to be at such a distance apart as to leave sufficient space for the seed to pass out in the desired quantity. The face of the cylinder F is concaved, as shown in Fig. 2, so as to round off the top of the ridge as it rolls along the ground. G is the opener to open a furrow to receive the seed. The shank of the opener G passes up through a mortise in the rear part of the draw-bar A, where it is secured in place by a wedge, so that it may be readily adjusted as may be required. To the opener G, or to an arm or lug formed upon or attached to the said opener, is attached the forward end of a short chain, H, which passes back through the furrow or drill, directly beneath the discharge-opening of the cylinder F, so as to spread the seed along the drill as it is discharged from said cylinder. The chain H draws the seed into the bottom of the drill, works it into the soil, and partially covers it, so that in light soils no other covering will be needed. The rear end of the chain H may be left free, or it may be connected with the middle part of the covering-bar I, which is secured to the V-shaped rods J at their angle. The ends of the arms of the rods J are secured to the middle parts of the side bars D. K are the handles, the forward ends of which are secured to the short standard L attached to the draw-bar A. The handles K pass back above the cylinder F, and their rear parts are secured to the ends of a round, M, that passes through, and is secured to the standard N attached to the center of the rear cross-bar of the side bars D.

Having thus described my invention, I claim as new and desire to secure by Letters Patent—

The combination of the seed-distributing chain H with the opener G, and with the seed-dropping cylinder F, substantially as herein shown and described.

JAMES B. ONAN.

Witnesses:
W. K. HARRISON,
R. W. FRIEND.